US010362235B2

(12) United States Patent
Kusumi et al.

(10) Patent No.: US 10,362,235 B2
(45) Date of Patent: Jul. 23, 2019

(54) PROCESSING APPARATUS, PROCESSING SYSTEM, IMAGE PICKUP APPARATUS, PROCESSING METHOD, AND STORAGE MEDIUM

(71) Applicant: CANON KABUSHIKI KAISHA, Tokyo (JP)

(72) Inventors: Yuichi Kusumi, Utsunomiya (JP); Chiaki Inoue, Utsunomiya (JP); Yoshiaki Ida, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 15/712,207

(22) Filed: Sep. 22, 2017

(65) Prior Publication Data
US 2018/0091718 A1 Mar. 29, 2018

(30) Foreign Application Priority Data

Sep. 28, 2016 (JP) .................................. 2016-189453

(51) Int. Cl.
*H04N 5/225* (2006.01)
*H04N 5/235* (2006.01)
(Continued)

(52) U.S. Cl.
CPC ........... *H04N 5/2351* (2013.01); *G06T 7/586* (2017.01); *H04N 5/2256* (2013.01); *H04N 5/2354* (2013.01); *H04N 5/265* (2013.01)

(58) Field of Classification Search
CPC .... H04N 5/2351; H04N 5/265; H04N 5/2354; H04N 5/2256; G06T 7/586
See application file for complete search history.

(56) References Cited

U.S. PATENT DOCUMENTS

2007/0110309 A1* 5/2007 Ibrahim .................... G06T 7/73
382/171
2009/0028424 A1* 1/2009 Sato ........................ G06T 5/007
382/162

(Continued)

FOREIGN PATENT DOCUMENTS

JP 2010122158 A 6/2010
JP 2012122870 A 6/2012

OTHER PUBLICATIONS

Matsushita. "Photometric Stereo." The Special Interest Group Technical Reports of IPSJ. 2011:1-12. vol. 2011-CVIM-177. No. 29. English abstract provided.

*Primary Examiner* — Chia Wei A Chen
*Assistant Examiner* — John H. Morehead, III
(74) *Attorney, Agent, or Firm* — Rossi, Kimms, & McDowell LLP

(57) ABSTRACT

A processing apparatus includes a photographed image obtainer configured to obtain a plurality of photographed images of an object, the images being photographed by sequentially irradiating light onto the object from a plurality of different light source positions, a first shadow map generator configured to generate a first shadow map by determining a shadow area in the plurality of photographed images, a second shadow map generator configured to generate a second shadow map based on the first shadow map, and a normal information obtainer configured to obtain normal information of the object calculated based on the second shadow map and the plurality of photographed images.

17 Claims, 11 Drawing Sheets

(51) Int. Cl.
*H04N 5/265* (2006.01)
*G06T 7/586* (2017.01)

(56) References Cited

U.S. PATENT DOCUMENTS

| | | | | |
|---|---|---|---|---|
| 2010/0303344 A1* | 12/2010 | Sato | ............... | H04N 9/045 |
| | | | | 382/162 |
| 2012/0057755 A1* | 3/2012 | Berkvens | ........... | H05B 37/0227 |
| | | | | 382/103 |
| 2015/0242701 A1* | 8/2015 | Tokui | ................ | H04N 5/243 |
| | | | | 382/190 |

* cited by examiner

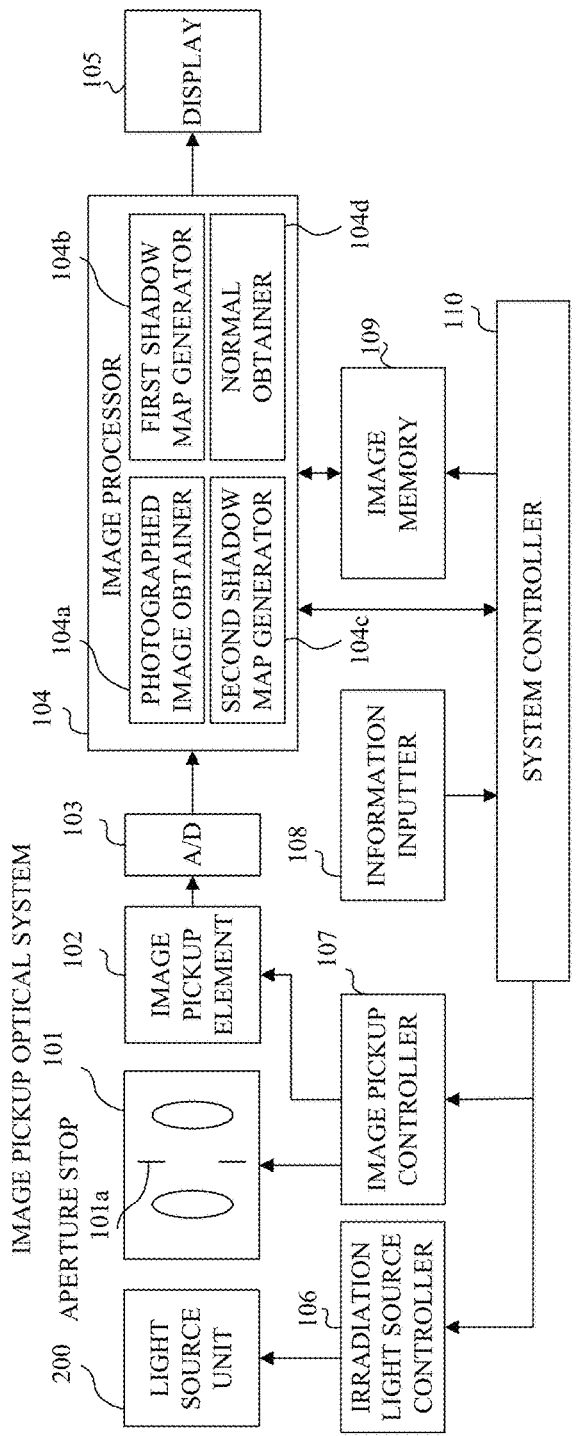
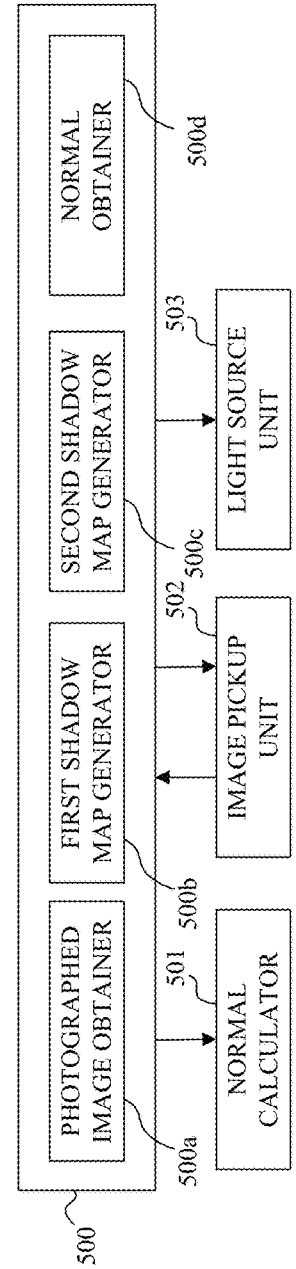
FIG. 2A
FIG. 2B

| 0 | 0 | 0 | 0 | 0 | 0 | 0 |
|---|---|---|---|---|---|---|
| 5 | 5 | 5 | 5 | 5 | 5 | 5 |
| 20 | 20 | 20 | 20 | 20 | 20 | 20 |
| 50 | 50 | 50 | 50 | 50 | 50 | 50 |
| 200 | 200 | 200 | 200 | 200 | 200 | 200 |
| 200 | 200 | 200 | 200 | 200 | 200 | 200 |
| 200 | 200 | 200 | 200 | 200 | 200 | 200 |

} SHADOW AREA
} SHADOW BOUNDARY AREA
} NON-SHADOW AREA
} AREA TO BE DETERMINED AS SHADOW

FIG. 4A

| 1 | 1 | 1 | 1 | 1 | 1 | 1 |
|---|---|---|---|---|---|---|
| 1 | 1 | 1 | 1 | 1 | 1 | 1 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

| 0.008 | 0.016 | 0.02 | 0.0016 | 0.008 |
|---|---|---|---|---|
| 0.016 | 0.06 | 0.1 | 0.06 | 0.016 |
| 0.02 | 0.1 | 0.13 | 0.1 | 0.02 |
| 0.016 | 0.06 | 0.1 | 0.06 | 0.016 |
| 0.008 | 0.016 | 0.02 | 0.016 | 0.008 |

FIG. 7A

| 0 | 1 | 1 | 1 | 0 |
|---|---|---|---|---|
| 1 | 1 | 1 | 1 | 1 |
| 1 | 1 | 1 | 1 | 1 |
| 1 | 1 | 1 | 1 | 1 |
| 0 | 1 | 1 | 1 | 0 |

FIG. 7B

PROCESSING APPARATUS, PROCESSING SYSTEM, IMAGE PICKUP APPARATUS, PROCESSING METHOD, AND STORAGE MEDIUM

BACKGROUND OF THE INVENTION

Field of the Invention

The present invention relates to a processing method, a processing system, an image pickup apparatus, a processing method, and a storage medium.

Description of the Related Art

An image based on a physical model can be generated in image processing after image pickup by obtaining more physical information on an object. For example, an image in which a view of the object is varied can be generated. The view of the object is determined by shape information of the object, reflectance information of the object, light source information, etc. Since a physical behavior of light emitted from the light source and reflected by the object depends on a local plane normal, use of the plane normal of the object is particularly effective as shape information rather than the three-dimensional shape. One known method for obtaining the plane normal of the object is a method for converting into plane normal information a three-dimensional shape calculated based on distance information obtained by a method, such as a triangulation using a laser beam and twin-lens stereo. However, this method needs a complex apparatus, and has an insufficient precision of the obtained plane normal.

Each of Japanese Patent Laid-Open No. ("JP") 2010-122158 and Yasuyuki Matsushita, "photometric stereo", The Special Interest Group Technical Reports of IPSJ, Vol. 2011-CVIM-177, No. 29, pp. 1-12, 2011 discloses a photometric stereo method as a method for directly acquiring a plane normal of an object. The photometric stereo method assumes a reflective characteristic of an object based on the plane normal of the object and the direction from the object to the light source, and calculates the plane normal based on luminance information of the object at a plurality of light source positions and assumed reflective characteristic. The reflective characteristic of the object can be approximated, for example, with a Lambert reflection model that accords with the Lambert cosine law.

Since the photometric stereo method needs the luminance information of the object at the plurality of light source positions, the plane normal of the object cannot be correctly calculated given the luminance information at the light source positions at which no luminance information is observed due to the shadows and luminance or brightness saturation. JP 2012-122870 discloses a method for determining a threshold at a light source position in which no luminance information is observed, for prohibiting the luminance information at that light source position from being used, and for precisely calculating the plane normal of the object.

In acquiring the plane normal of the object by the photometric stereo method, a shadow area in the object may be generated when the irradiated light is shielded. For the area in which no luminance information can be obtained, such as the shadow area, the plane normal of the object can be calculated through a threshold determination disclosed in JP 2012-122870. However, a boundary part of an area between the shadow area and the non-shadow area (referred to as a "shadow boundary area" hereinafter) may be blurred due to the aberration of an image pickup optical system, a light diffraction in a shield, an influence of the light source size, internal scattering in the object, etc. Since an original luminance value cannot be obtained which is to be otherwise observed under a non-shield circumstance of the light irradiated on the shadow boundary area, the shadow boundary area may be determined as a shadow and may not be used to calculate the plane normal, similar to the shadow area. Since the shadow boundary area has a certain luminance value, the threshold determination does not determine that it is the shadow. Hence, the plane normal calculating process using the threshold determination cannot correctly the plane normal of the object in the shadow boundary area.

SUMMARY OF THE INVENTION

The present invention provides a processing method, a processing system, an image pickup apparatus, a processing method and a storage medium, which can highly precisely calculate a plane normal of an object in a shadow boundary area.

A processing apparatus according to one aspect of the present invention includes a photographed image obtainer configured to obtain a plurality of photographed images of an object, the images being photographed by sequentially irradiating light onto the object from a plurality of different light source positions, a first shadow map generator configured to generate a first shadow map by determining a shadow area in the plurality of photographed images, a second shadow map generator configured to generate a second shadow map based on the first shadow map, and a normal information obtainer configured to obtain normal information of the object calculated based on the second shadow map and the plurality of photographed images.

Further features of the present invention will become apparent from the following description of exemplary embodiments with reference to the attached drawings.

BRIEF DESCRIPTION OF THE DRAWINGS

FIG. 2A is a block diagram of the image pickup apparatus according to the first embodiment.

FIG. 2B illustrates a processing system according to the first embodiment.

FIGS. 4A and 4B illustrate an illustrative preparation of a first shadow map according to the first embodiment.

FIGS. 5A to 5C illustrate a calculation method of a differential value peak in a photographed image according to the first embodiment.

FIGS. 6A to 6D illustrate an illustrative preparation of a second shadow map according to the first embodiment.

FIGS. 7A and 7B illustrate a parameter determining method for a dilation process using a PSF according to the first embodiment.

DESCRIPTION OF THE EMBODIMENTS

Figure 1:
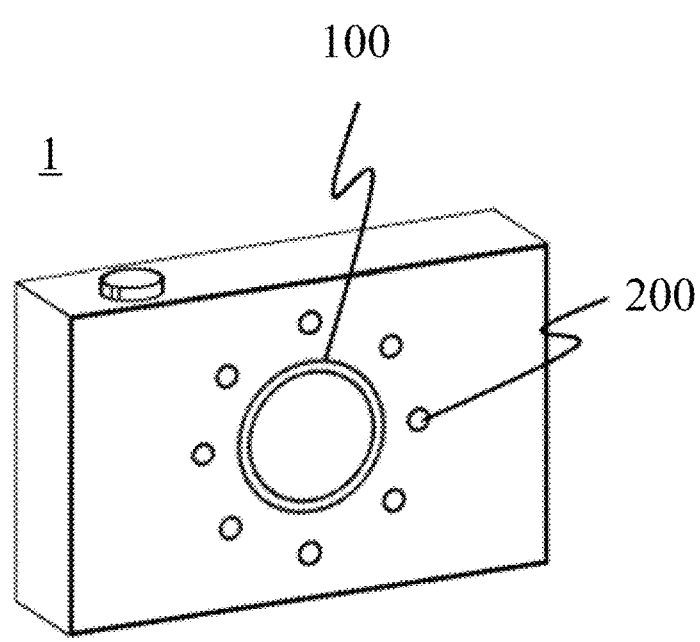
FIG. 1 is an overview of an image pickup apparatus according to a first embodiment.

Referring now to the accompanying drawings, a description will be given of embodiments of the present invention. Corresponding elements in each figure will be designated by the same reference numerals, and a duplicate description thereof will be omitted.

Figure 15:
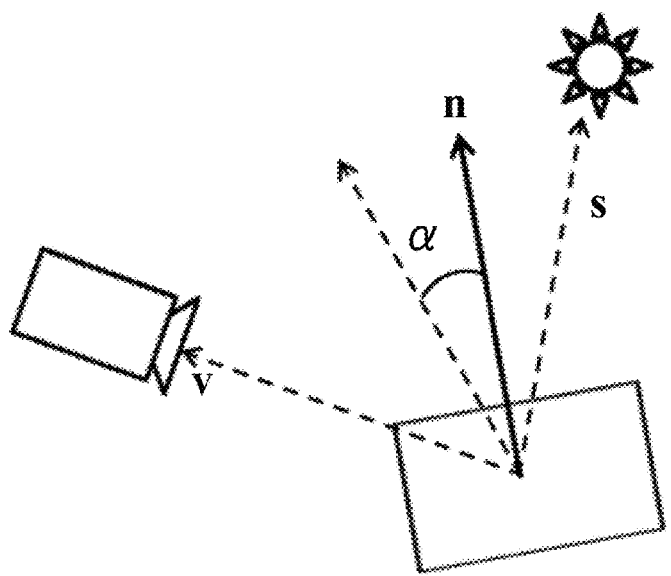
FIG. 15 is an explanatory view of a Torrance-Sparrow model.

The photometric stereo method is a method for assuming a reflective characteristic of an object based on a plane normal of the object and a direction from the object to the light source and for calculating a plane normal based on luminance information of the object at a plurality of light source positions and the assumed reflective characteristic. The reflective characteristic may be approximated by a Lambert reflection model that accords with the Lambert cosine law, where the reflectance is not uniquely determined given the predetermined plane normal and the position of the light source. A specular reflection component depends on an angle $\alpha$ between a plane normal n and a bisector between a light source vector s and a visual line vector v, as illustrated in FIG. 15. Hence, the reflective characteristic may be set to a characteristic based on the visual line direction. The luminance information may be calculated by eliminating an influence of a nonlight source, such as environmental light, by photographing the object when the light source turns on, by photographing the object when the light source turns off, and by calculating a difference.

A description will now be given of a Lambert reflection model having a assumed reflective characteristic. Where i is a luminance value of reflected light, $\rho_d$ is a Lambert diffuse reflectance of the object, E is an intensity of incident light, s is a unit vector (light source vector) representing a direction (light source direction) from the object to the light source, and n is a unit plane normal vector of the object, the luminance value i is represented by the following expression (1) based on the Lambert cosine law.

$$i = E\rho_d s \cdot n \qquad (1)$$

Where $s_1, s_2, \ldots, s_M$ are components of M different light source vectors (M≥3), and $i_1, i_2, \ldots, i_M$ are luminance values of the components of the light source vectors, the expression (1) is represented as follows.

$$\begin{bmatrix} i_1 \\ \vdots \\ i_M \end{bmatrix} = \begin{bmatrix} s_1^T \\ \vdots \\ s_M^T \end{bmatrix} E\rho_d n \qquad (2)$$

The left side of the expression (2) is a M×1 luminance vector, and the right side $[s_1^T, \ldots, s_M^T]$ is an incident light matrix S representing a M×3 light source direction, and n is a 3×1 unit plane normal vector. Where M=3, $E\rho_d n$ is expressed as follows with an inverse matrix $S^{-1}$ of the incident light matrix S.

$$E\rho_d n = S^{-1} \begin{bmatrix} i_1 \\ \vdots \\ i_M \end{bmatrix} \qquad (3)$$

The norm of the vector on the left side in the expression (3) is a product of the intensity E of the incident light and the Lambert diffuse reflectance $\rho_d$, and the normalized vector is calculated as a plane normal vector of the object. In other words, the intensity E of the incident light and the Lambert diffuse reflectance $\rho_d$ appear on the conditional expression only in the product form. Where $E\rho_d$ is considered as one variable, the expression (3) can be regarded as simultaneous equations that determine three unknown variables in addition to the two freedom degrees of the unit plane normal vector n. Hence, each variable can be determined by acquiring the luminance information with at least three light sources.

Where the incident light matrix S is not a regular matrix, no inverse matrix exists. It is thus necessary to select the components $s_1$ to $s_3$ of the incident light matrix S so that the incident light matrix S becomes a regular matrix. In other words, it is necessary to linearly and independently select the component $s_3$ relative to the components $s_1$ and $s_2$.

Since conditional expressions more than the unknown variables to be calculated can be obtained where M>3, the unit plane normal vector n may be calculated by the method similar to a case of M=3 based on three arbitrarily selected conditional expressions. Given four or more conditional expressions, the incident light matrix S does not become a regular matrix and thus the approximate solution may be calculated with the Moore-Penrose pseudo inverse matrix. Alternatively, the fitting method or the optimization method may be used to calculate the unit plane normal vector n.

The unit plane normal vector becomes incorrect when it is calculated based on one of the luminance values in the components of the light source vector which is not obtained as a correct value due to the shadow or luminance saturation. Hence, the unit plane normal vector n may be calculated without using the luminance value that is not obtained as a correct value due to the shadow or luminance saturation. In other words, where the luminance value $i_m$ obtained with the light source vector $s_m$ in case of M=m is influenced by the shadow or the luminance saturation, the unit plane normal vector n is calculated by excluding the light source vector $s_m$ and the luminance value $i_m$ from the expression (3). The excluded luminance value may be determined based on the threshold determination. As described above, at least three pieces of luminance information are necessary to calculate the unit plane normal vector n.

Where M>3, a plurality of, i.e., three or more and M−1 or less conditional expressions are obtained and thus a plurality of solution candidates of the unit normal vector n may be calculated. In this case, the solution may be selected based on the plurality of solution candidates with the other conditions. For example, the continuity of the unit plane normal vector n can be used as a condition. Where the unit plane normal n is calculated for each pixel of the image pickup apparatus, a solution that minimizes an evaluation function expressed by the following expression (4) may be selected where n(x, y) is a plane normal at the pixel (x, y) and n(x−1, y) is known.

$$1 - n(x,y) \cdot n(x-1,y) \qquad (4)$$

Where n(x+1, y) and n(x, y±1) are known, a solution that minimizes the following expression (5) may be selected.

$$4 - n(x,y) \cdot n(x-1,y) - n(x,y) \cdot n(x+1,y) - n(x,y) \cdot n(x,y-1) - n(x,y) \cdot n(x,y+1) \quad (5)$$

A solution that minimizes a total sum of the expression (5) for all pixels expressed by the following expression (6) may be selected where there is no known plane normal and the plane normal is uncertain at all pixel positions.

$$\sum_{x,y} \{4 - n(x,y) \cdot n(x-1,y) - n(x,y) \cdot n(x+1,y) - n(x,y) \cdot n(x,y-1) - n(x,y) \cdot n(x,y+1)\} \quad (6)$$

A plane normal to a pixel other than the closest pixel or an evaluation function weighted based on a distance from an addressed pixel position may be used.

Luminance information at an arbitrary light source position may be used for another condition. In the diffuse reflection model represented by the Lambert reflection model, the luminance of the reflected light increases as the unit plane normal vector is closer to the light source direction vector. Therefore, the unit plane normal vector can be determined by selecting a solution closer to the light source direction vector which has the highest luminance value among the luminance values in the plurality of light source directions.

In addition, the following expression (7) is established in the specular reflection model, where s is a light source vector, and v is a unit vector (visual light vector of the camera) in the direction in the camera from the object.

$$s + v = 2(v \cdot n)n \quad (7)$$

As expressed in the expression (7), the unit plane normal vector n can be calculated where the light source direction vector s and the visual line vector v of the camera are known. If the surface is rough, the specular reflection has a spread of the exit angle near the solution calculated on the assumption of the smooth surface. Therefore, one of the plurality of solution candidates closest to the solution for the smooth surface may be selected. In addition, a true solution may be determined by averaging the plurality of solution candidates.

First Embodiment

FIG. 1 is an overview of an image pickup apparatus 1 according to this embodiment. FIG. 2A is a block diagram of the image pickup apparatus 1. The image pickup apparatus 1 includes an image pickup unit 100 and a light source unit 200. The image pickup unit 100 includes an image pickup optical system 101. The light source unit 200 includes eight light sources concentrically arranged at regular intervals around the optical axis of the image pickup optical system 101 as a center. The photometric stereo method needs at least three light sources, and thus the light source unit 200 may include three or more light sources. While the light source 200 in this embodiment includes a plurality of concentrically arranged light sources around the light axis of the image pickup optical system 101 as a center, but the present invention is not limited to this embodiment. While this embodiment provides the light source unit 200 inside the image pickup apparatus 1, the light source unit 200 may be attached to and detached from the image pickup apparatus 1.

The image pickup optical system 101 includes an aperture stop 101a, and images light from the object on an image pickup element 102. The imaging optical system 101 in this embodiment is included in the image pickup apparatus 1, but may be attached to and detached from the image pickup apparatus 1 like a single-lens reflex camera. The image pickup element 102 includes a photoelectric conversion element, such as a CCD sensor and a CMOS sensor, and forms an object image. An analog electric signal generated by a photoelectric conversion of the image pickup element 102 is converted into a digital signal by an A/D converter 103 and input into an image processor 104.

The image processor 104 calculates normal information of the object as well as performing general image processing to the digital signal. The image processor 104 includes a photographed image obtainer 104a, a first shadow map generator 104b configured to generate a first shadow map, a second shadow map generator 104c configured to generate a second shadow map based on the first shadow map, and a normal obtainer (normal information obtainer) 104d. The output image processed by the image processor 104 is stored in an image memory 109, such as a semiconductor memory and an optical disc. The output image may be displayed on a display (unit) 105. In this embodiment, the photographed image obtainer 104a, the first shadow map generator 104b, the second shadow map generator 104c, and the normal obtainer 104d are installed in the image pickup apparatus 1, these components may be configured separately from the image pickup apparatus 1, as described later.

An information inputter 108 supplies an image pickup condition selected by the user, such as an F-number, an exposure time period, and a focal length, to a system controller 110. The image pickup controller 107 obtains an image under a predetermined image pickup condition selected by the user based on information from the system controller 110. An irradiation light source controller 106 controls a light emitting state of the light source unit 200 in accordance with a command from the system controller 110.

Figure 3:
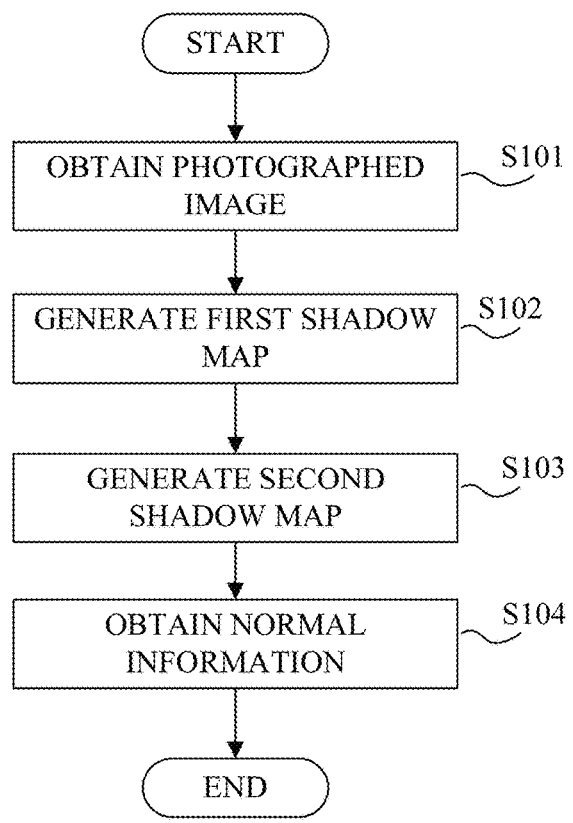
FIG. 3 is a flowchart of a plane normal calculating process according to the first embodiment.

Referring now to FIG. 3, a description will be given of a plane normal calculating process according to this embodiment. FIG. 3 is a flowchart of a plane normal calculating process according to this embodiment. The plane normal calculating process according to this embodiment is executed by the system controller 110 and the image processor 104 in accordance with a processing program as a computer program. The processing program may be recorded, for example, in a computer-readable storage medium.

In the step S101, the photographed image obtainer 104a obtains a plurality of photographed images obtained by imaging the object with a plurality of light source positions that are different from one another. The plurality of photographed images may be obtained by sequentially irradiating light from the light source by changing a single light source position, or sequentially irradiating light from a plurality of light sources located at different positions.

In the step S102, the first shadow map generator 104b generates a plurality of first shadow maps made by mapping pixels determined as shadows in each of the plurality of photographed images obtained in the step S101. For example, the first shadow map may be generated by the threshold determination that determines as the shadow a pixel having a luminance value smaller than a threshold on all pixels in each photographed image. Alternatively, the first shadow map may be obtained from the photographed images obtained in the step S101 by appending the first shadow map generated in the image pickup to the photographed image. While this embodiment generates the first shadow map for each photographed image, the first shadow map and the second shadow map, which will be described later, may be generated only for the photographed image with the previously recognized light source position that causes the shadow.

FIGS. 4A and 4B illustrate an illustrative preparation of the first shadow map. FIG. 4B illustrates the first shadow map generated through a threshold determination to a photographed image illustrated in FIG. 4A by setting the threshold to 10. The first shadow map illustrated in FIG. 4B illustrates a shadow pixel as 1 and a non-shadow pixel as 0. As illustrated in FIG. 4B, the shadow boundary area is not determined as a shadow.

In the step S103, the second shadow map generator 104c generates a plurality of second shadow maps corresponding to the plurality of shadow maps generated in the step S102. As described above, the shadow boundary area may not be used to calculate the plane normal similar to the shadow area, but the shadow boundary area has a certain luminance value and thus is not determined as a shadow in the threshold determination. Therefore, the plane normal calculating process using the threshold determination cannot correctly calculate the plane normal of the object in the shadow boundary area. Accordingly, the second shadow map generator 104c treats the shadow boundary area as the shadow area, and generates the second shadow map by dilating the first shadow map through the dilation process in the general image processing.

The dilation process dilates the first shadow map by determining the pixel to be the shadow when there is a pixel determined to be a shadow in the structured element with each pixel in the first shadow map as an origin. A parameter, such as a size and a shape of the structured element and the number of dilations, may be arbitrarily determined in the dilation process. The parameter of the dilation process may be determined so that only the shadow dilation area is treated as the shadow area. For example, a peak of a differential value (luminance gradient) in the photographed image in FIG. 4A is searched near the edge in the first shadow map in FIG. 4B and the parameter in the dilation process may be determined such that the peak pixel can be determined as a shadow.

Figures 5A, 5B, 5C:
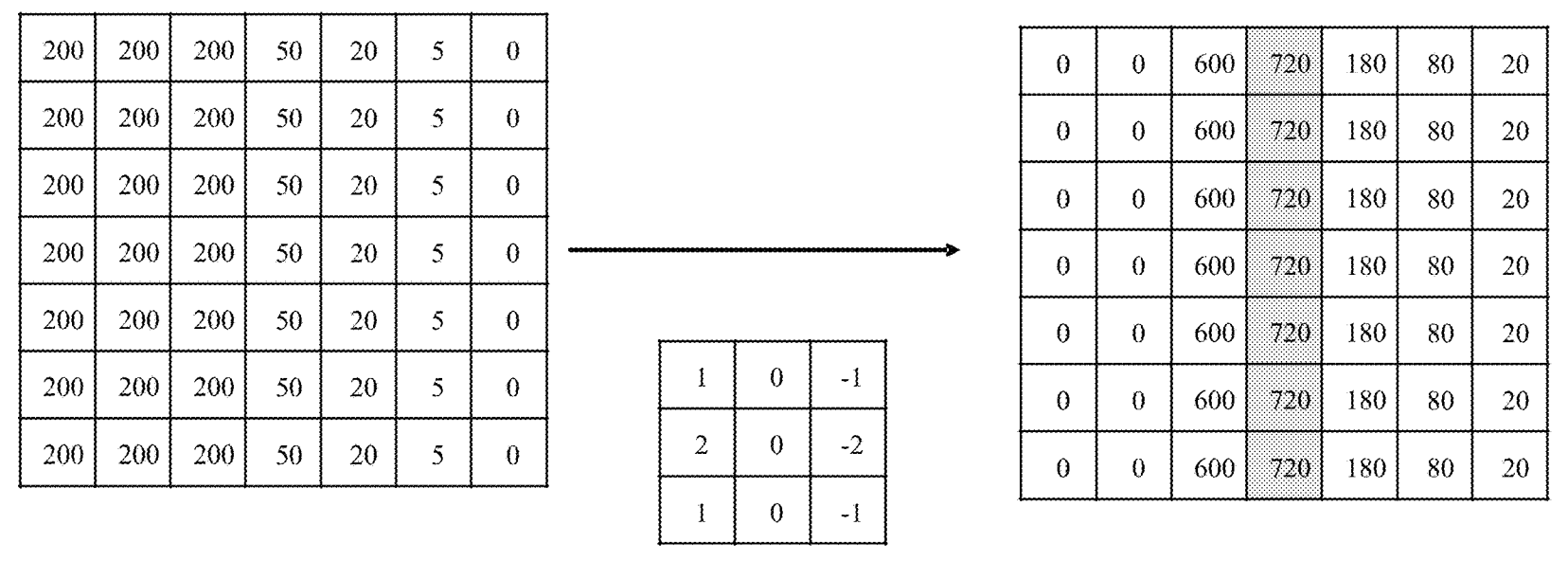

FIGS. 5A to 5C illustrate a method for calculating the peak of the differential value in the photographed image. This embodiment calculates a differential value illustrated in FIG. 5C by applying a Sobel filter illustrated in FIG. 5B to part of a photographed image illustrated in FIG. 5A. This embodiment applies the Sobel filter in the horizontal direction but may apply a Sobel filter in a vertical direction. Since a luminance value may often significantly vary at the boundary between the shadow boundary area and the non-shadow area, the peak of the differential value corresponds to the boundary part. Accordingly, until the pixel (gray part) of the peak of the differential value illustrated in FIG. 5C is determined to be the shadow, the dilation process is performed for the first shadow map.

Figures 6A, 6B, 6C, 6D:
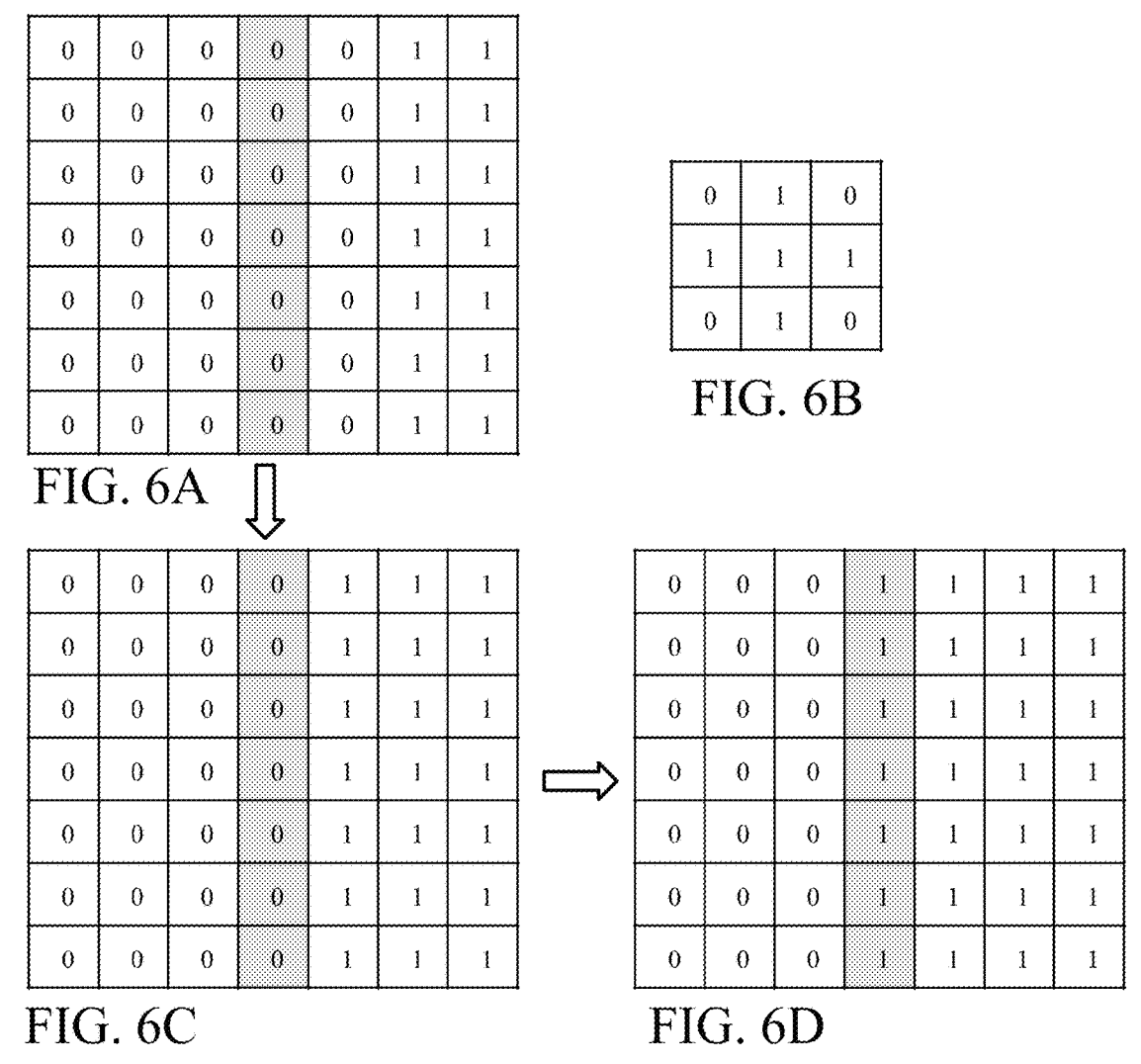

FIGS. 6A to 6D illustrate an illustrative preparation of the second shadow map. This embodiment generates the second shadow map by performing the dilation process for a first shadow map illustrated in FIG. 6A a plurality of times by using the structured element that includes three pixels in the horizontal direction and three pixels in the vertical direction by setting the center illustrated in FIG. 6B to the origin. In the shadow map illustrated in FIG. 6C after the dilation process is performed once, the pixels of the peak (gray part) of the differential value are not determined as shadows. This embodiment resumes the dilation process, and generates the second shadow map in which the pixels of the peak of the differential value illustrated in FIG. 6D are determined to be shadows (or the shadow boundary area is determined to be the shadow). While this embodiment performs the dilation process a plurality of times and generates the second shadow map in which the shadow boundary area is determined to be the shadow, the present invention is not limited to this embodiment. For example, the dilation process may be performed by adjusting the size and shape of the structured element. In addition, this embodiment performs the dilation process such that the pixel of the differential value peak is determined as a shadow, the present invention is not limited to this embodiment. For example, the parameter of the dilation process may be performed by estimating the breadth of the shadow boundary area.

The optical information of the image pickup optical system may be used to determine the parameter of the dilation process by estimating the breadth of the shadow boundary area. Since the shadow boundary area is an area in which a blur occurs due to aberrations of the image pickup optical system, etc., the parameter of the dilation process can be determined based on a blur amount (aberration information) depending on the optical information. One example of the blur amount based on the optical information is a point spread function (PSF). The photographed image obtained through image pickup is an ideal object image convoluted with the PSF. Hence, the PSF is used as the structured element for the dilation process to the first shadow map. For example, the dilation process is performed with a structured element illustrated in FIG. 7B (that is made by binarizing the PSF illustrated in FIG. 7A (with a threshold of 0.01) of the image pickup optical system.

The PSF has lots of types depending on the state of the image pickup optical system. For example, in the zoom lens having a variable focal length, the number of PSFs corresponds to the number of combinations of the focal length, the F-number, the imaging distance, the position on the image pickup element (imaging plane), the color (wavelength), etc. Moreover, the PSF has more types when the characteristic of the image pickup element, such as a pixel size, is considered. Hence, in reality, necessary combinations among these many combinations for the dilation process may be stored. The PSF with the non-stored image pickup condition may be generated through an interpolation process.

The PSF may be previously calculated by the optical CAD etc., and stored as a database suitable for the dilation process in a memory. The PSF may be measured and stored as data. The second shadow map generator 104c may obtain the PSF corresponding to information, such as the focal length, the F-number, the image pickup distance, and the pixel size in the image pickup obtained from the photographed image among the pre-stored PSF database.

The dilation process may be performed by using the breadth of the shadow boundary area estimated based on an internal scattering property of the object, such as a Bidirectional Scattering Surface Reflectance Distribution Function ("BSSRDF").

In the step S104, the normal obtainer 104d calculates the normal information of the object by using the plurality of photographed images obtained by photographing the object with a plurality of different light source positions and the second shadow map generated in the step S103. In other words, the normal obtainer 104d calculates the plane normal through the photometric stereo method without using the luminance information of the pixel that is determined as the shadow by the second shadow map corresponding to the respective pixels in the plurality of photographed images. The normal information is calculated based on a change of the luminance information depending on the light source position. Since the photometric stereo method needs at least three pieces of luminance information for each pixel, it is necessary to prevent the number of pieces of luminance information from being less than three because the number of pieces of available luminance information reduces due to the second shadow map. The normal obtainer 104*d* in this embodiment calculates the normal information, but may obtain the normal information calculated by another unit.

This embodiment calculates the normal information of the object in the image pickup apparatus 1, but may calculate the normal information of the object using a processing system 2 different from the image pickup apparatus 1 as illustrated in FIG. 2B. The processing system 2 illustrated in FIG. 2B includes a processing apparatus 500, a normal calculator (normal information calculator) 501, an image pickup unit 502, and a light source unit 503. The processing apparatus 500 includes a photographed image obtainer 500*a*, a first shadow map generator 500*b*, a second shadow map generator 500*c*, and a normal obtainer (normal information obtainer) 500*d*. In calculating the normal information using the processing system 2, the photographed image obtainer 500*a* initially obtains a plurality of photographed images obtained by photographing the object with a plurality of light source positions. Next, the first shadow map generator 500*b* obtains the first shadow map based on the plurality of photographed images obtained by the photographed image obtainer 500*a*. The second shadow map generator 500*c* generates the second shadow map based on the first shadow map generated by the first shadow map generator 500*b*. Moreover, the normal calculator 501 calculates the normal information of the object using the plurality of photographed images obtained by the photographed image obtainer 500*a* and the second shadow map generated by the second shadow map generator 500*c*. Finally, the normal obtainer 500*d* obtains the normal information calculated by the normal calculator 501. The processing system may include at least the processing apparatus 500 and the normal calculator 501, and the processing apparatus 500 may include the normal calculator 501. Each of the image pickup unit 502 and the light source unit 503 may be configured as an independent apparatus or the light source unit 503 may be installed in the image pickup unit 502.

As described above, this embodiment can highly precisely calculate the normal information of the object even in the shadow boundary area.

Second Embodiment

This embodiment describes a method for performing a dilation process based on a breath of the shadow boundary area estimated based on at least one of a three-dimensional position relationship (image pickup condition) among a light shield an object, and a light source, and the size of the light source (light source condition) as causes of the shadow, and for acquiring normal information. The image pickup apparatus in this embodiment is similar to that of the first embodiment, but needs three-dimensional position information of the object space and thus may include the following object distance calculator.

Figure 8:
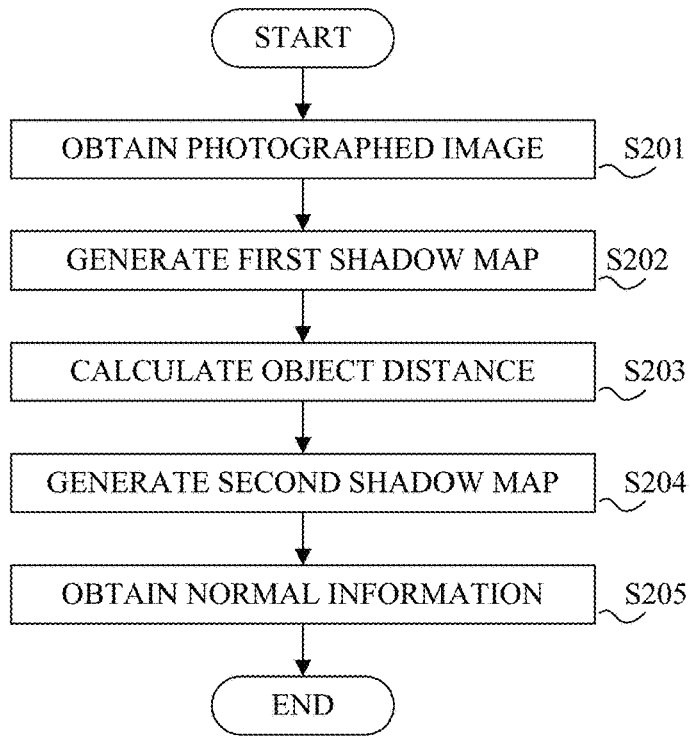
FIG. 8 is a flowchart of a plane normal calculating process according to a second embodiment.

Referring now to FIG. 8, a description will be given of a plane normal calculating process according to this embodiment. FIG. 8 is a flowchart of the plane normal calculating process according to this embodiment. The plane normal calculating process is executed by the system controller 110 and the image processor 104 illustrated in FIG. 2A in accordance with the processing program as a computer program. The processing program may be recorded, for example, in a non-transitory computer-readable storage medium.

The steps S201, S202, and S205 are similar to the steps S101, S102, and S104 in the first embodiment, and a description thereof will be omitted.

In the step S203, the object distance calculator calculates the object distance. This embodiment calculates the object distance by the stereo method for acquiring a plurality of parallax images captured from a plurality of different viewpoints. The stereo method calculates the depth through the triangulation based on the parallax amount of a corresponding point on the object in the plurality of captured parallax images, the position information of each viewpoint, and the focal length of the optical system. The object distance may be an average value of the depth calculated with the corresponding points of the object, or may be the depth at a specific point on the object. In calculating the object distance based on the parallax image, the image pickup unit for the plurality of parallax images include, as illustrated in FIG. 9, an imaging system configured to perform a photoelectric conversion by guiding a plurality of light fluxes that have passed different areas in the pupil in the image pickup optical system to different light receiving parts (pixels) on the image pickup element.

Figure 9:
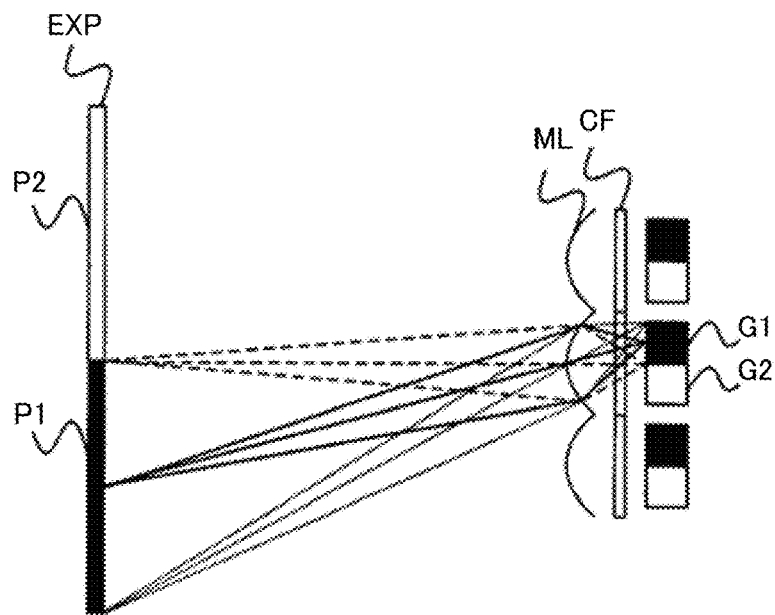
FIG. 9 is a relationship diagram between a light receiving part in an image pickup element and a pupil in an image pickup optical system according to the second embodiment.

FIG. 9 illustrates a relationship between the light receiving parts on the image pickup element and the pupil in the image pickup optical system. The image pickup element includes a pair of G1 and G2 pixels (a pixel pair) that constitute the light receiving part. A plurality of G1 pixels will be correctively referred to as a G1 pixel unit, and a plurality of G2 pixels will be correctively referred to as a G2 pixel unit. The pair of G1 and G2 pixels are conjugate with the exit pupil EXP in the image pickup optical system via a common micro lens ML (which is provided for each pixel pair). In addition, a color filter CF is provided between the micro lens ML and the light receiving part.

Figure 10:
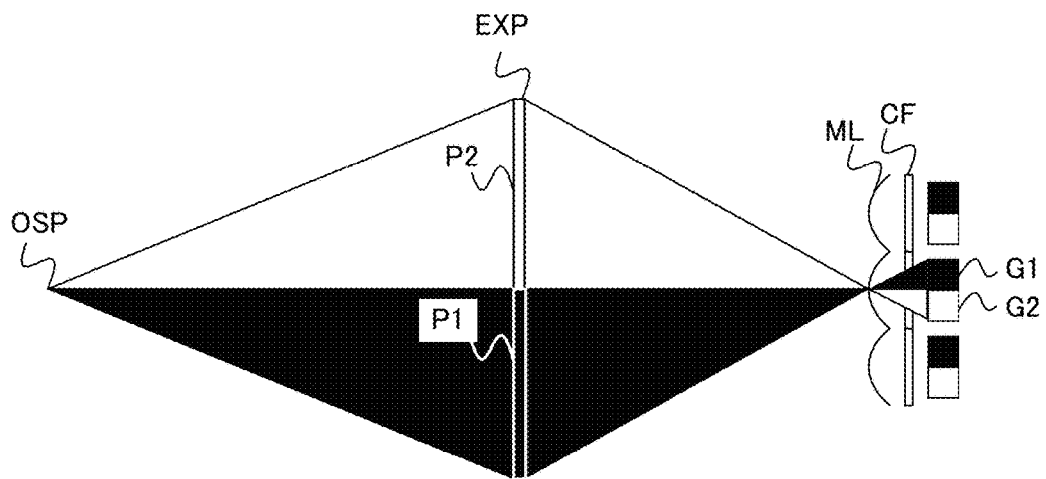
FIG. 10 is a schematic diagram of an image pickup unit according to the second embodiment.

FIG. 10 is a schematic view of an imaging system when it is assumed that there is a thin lens at a position of the exit pupil EXP in FIG. 9. The G1 pixel receives a light flux that has passed a P1 area in the exit pupil EXP, and the G2 pixel receives a light flux that has passed a P2 area in the exit pupil EXP. The object does not have to exist at a photographed object point OSP and a light flux that has passed the object point OSP enters the G1 or G2 pixel in accordance with the area (position) in the pupil to be passed. Light fluxes passing different areas in the pupil correspond to a separation of the incident light flux from the object OSP depending on the angle (parallax). In other words, among the G1 and G2 pixels provided for each micro lens ML, the image generated by using the output signal from the G1 pixel and the image generated by using the output signal from the G2 pixel constitute a plurality of (or herein a pair of) parallax images having parallaxes from each other. In the following description, a pupil division means receiving light fluxes that have passed different areas in the pupil on different light receiving parts (pixels).

In FIGS. 9 and 10, even when the above conjugate relationship does not become perfect or the P1 area and the P2 area partially overlap each other because of the positional shift of the exit pupil EXP, etc., the plurality of obtained images can be treated as parallax images.

Figure 11:
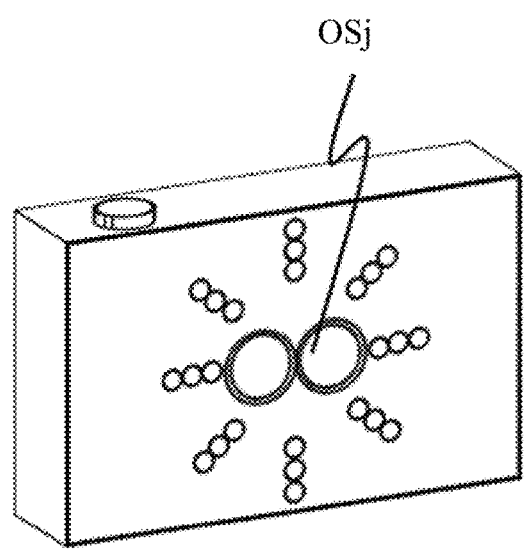
FIG. 11 is a schematic diagram of another image pickup unit according to the second embodiment.

FIG. 11 illustrates another imaging example. As illustrated in FIG. 11, the parallax image can be obtained by providing a plurality of image pickup optical systems OSj (j=1, 2, . . . ) to one image pickup apparatus. The parallax image can be obtained even when the same object is photographed with a plurality of cameras.

While this embodiment calculates the object distance through the stereo method, the present invention is not limited to this embodiment. For example, a laser distance measuring unit etc. may be used to calculate the object distance.

Figure 12:
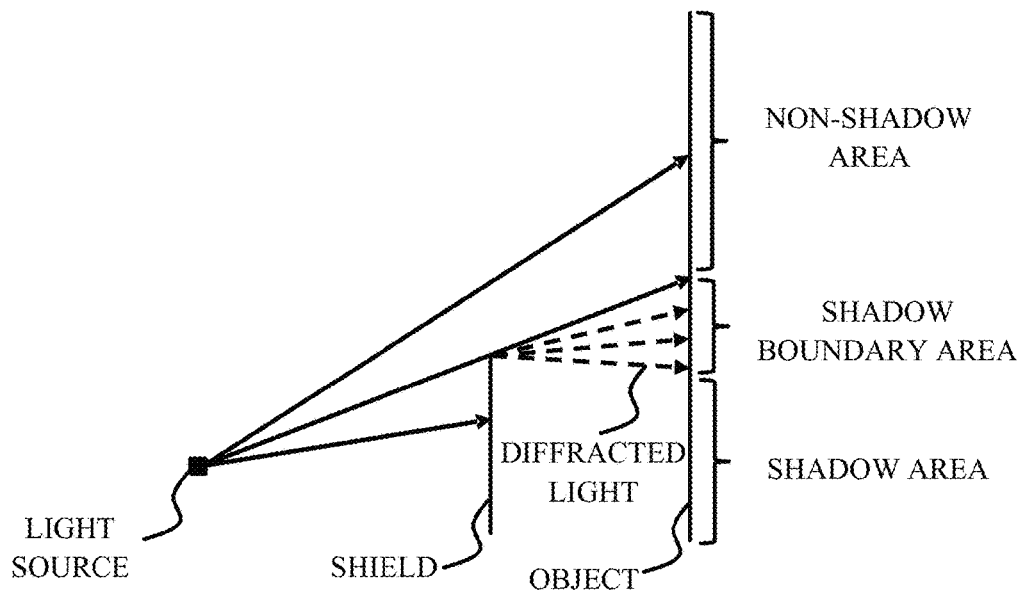
FIG. 12 illustrates a shadow boundary area in a light diffraction according to the second embodiment.
Figure 13:
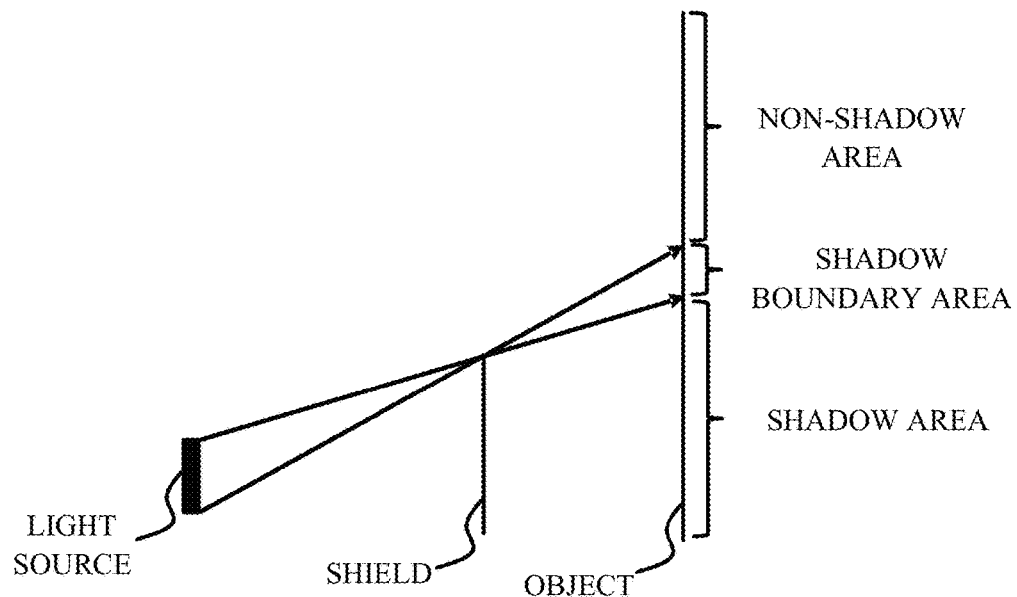
FIG. 13 illustrates the shadow boundary area due to the influence of the light source size according to the second embodiment.

In the step S204, the second shadow map generator 104 generates the second shadow map through the extension process using the breadth of the shadow boundary area estimated based on at least one of the image pickup condition and the light source condition. For example, as illustrated in FIG. 12, the dilation process may be performed by using the breadth of the shadow boundary area caused by the light diffraction phenomenon estimated based on the three-dimensional position relationship (image pickup condition) among the light shield, the object, and the light source causing the shadow. As illustrated in FIG. 13, the dilation process may be performed by using the breadth of the shadow boundary area estimated based on the three-dimensional position relationship and the light source size (light source condition).

As described above, this embodiment can highly precisely calculate the normal information of the object even in the shadow boundary area.

Third Embodiment

While the first and second embodiments describe an image pickup apparatus having a built-in light source, this embodiment describes a normal information acquiring system that includes an image pickup apparatus and a light source unit.

Figure 14:
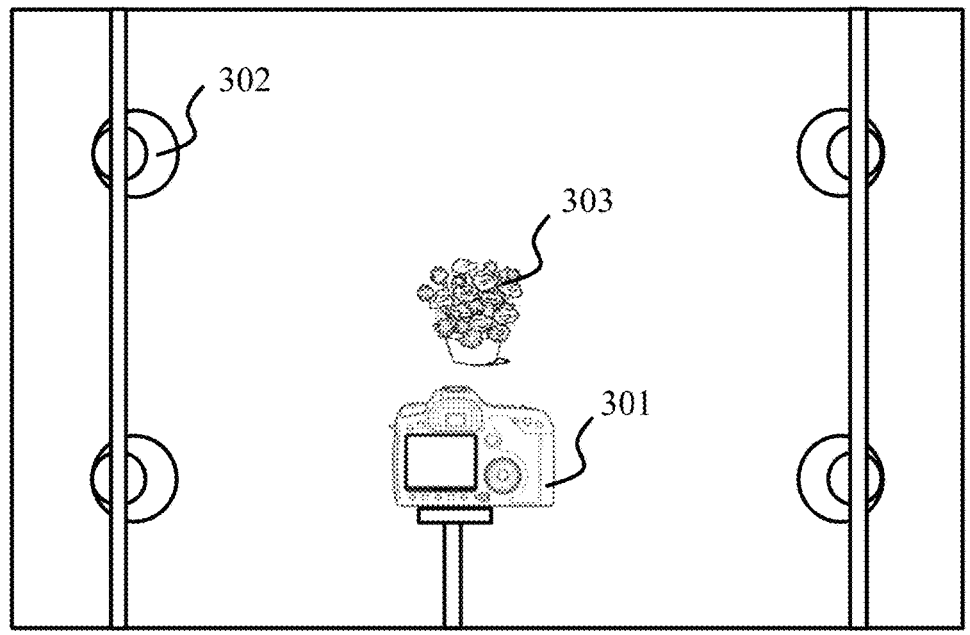
FIG. 14 is an overview of a normal information acquiring system according to a third embodiment.

FIG. 14 is an overview of the normal information acquiring system. The normal information acquiring system includes an image pickup apparatus 301 configured to photograph an object 303, and a plurality of light source units 302. The image pickup apparatus 301 in this embodiment is similar to that of the first embodiment, but may not contain a plurality of light sources.

The light source unit 302 may be connected to the image pickup apparatus 301 through a wire or wirelessly, and controlled based on information from the image pickup apparatus 301. While the photometric stereo method needs photographed images by sequentially irradiating light from at least three light sources, at least one light source may be provided if the light source unit has a movable light source. The light source may be moved and images may be captured with least three light sources. Where the light source unit 302 cannot automatically change the light source position or where the light source unit 302 cannot be controlled by the image pickup apparatus 301, the user may adjust the light source unit 302 so that the light source can be located at the light source position displayed on the display on the image pickup apparatus 301.

Since the plane normal calculating process of this embodiment is similar to the process of this embodiment, a detailed description thereof will be omitted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processing units (e.g., central processing unit (CPU), micro processing unit (MPU)) and may include a network of separate computers or separate processing units to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD®), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-189453, filed on Sep. 28, 2016 which is hereby incorporated by reference herein in its entirety.

What is claimed is:

1. A processing apparatus comprising:
   a photographed image obtainer configured to obtain a plurality of photographed images of an object, the images being photographed by sequentially irradiating light onto the object from a plurality of different light source positions;
   a first shadow map generator configured to generate a first shadow map by determining a shadow area in the plurality of photographed images;
   a second shadow map generator configured to generate a second shadow map based on the first shadow map; and
   a normal information obtainer configured to obtain normal information of the object calculated based on the second shadow map and the plurality of photographed images.

2. The processing apparatus according to claim 1, wherein the first shadow map generator generates a plurality of first shadow maps by determining shadow areas in the plurality of photographed images;
   wherein the second shadow map generator generates a plurality of second shadow maps corresponding to the plurality of first shadow maps, and
   wherein the normal information obtainer obtains normal information of the object based on the plurality of second shadow maps and the plurality of photographed images.

3. The processing apparatus according to claim 1, wherein the second shadow map generator generates the second shadow map by dilating the first shadow map.

4. The processing apparatus according to claim 1, wherein the second shadow map generator generates the second shadow map based on the first shadow map and luminance information of the plurality of photographed images.

5. The processing apparatus according to claim 4, wherein the second shadow map generator generates the second shadow map based on the first shadow map and a luminance gradient of the photographed image.

6. The processing apparatus according to claim 1, wherein the second shadow map generator generates the second shadow map based on the first shadow map and optical information.

7. The processing apparatus according to claim 6, wherein the optical information includes aberrational information of an image pickup optical system that has photographed the object.

8. The processing apparatus according to claim 1, wherein the second shadow map generator generates the second shadow map based on the first shadow map and at least one of an image pickup condition and a light source condition used to photograph the object.

9. The processing apparatus according to claim 8, wherein the second shadow map generator generates the second shadow map based on the first shadow map, and a diffraction phenomenon in an image pickup condition used to photograph the object.

10. The processing apparatus according to claim 1, further comprising a normal information calculator configured to calculate normal information of the object based on the second shadow map and the plurality of photographed images.

11. A processing system comprising:
a light source unit; and
a processing apparatus according to claim 1.

12. The processing system according to claim 11, wherein the light source unit is movable.

13. The processing system according to claim 11, wherein the light source unit includes three or more light sources located at different positions.

14. The processing system according to claim 11, further comprising an image pickup unit configured to photograph the object.

15. An image pickup apparatus comprising:
an image pickup unit configured to photograph an object onto which light is sequentially irradiated from a plurality of different light source positions; and
a processing apparatus according to claim 1.

16. A processing apparatus comprising the steps of:
acquiring a plurality of photographed images of an object, the images being photographed by sequentially irradiating light onto the object from a plurality of different light source positions;
generating a first shadow map by determining a shadow area in the plurality of photographed images;
generating a second shadow map based on the first shadow map; and
obtaining normal information of the object calculated based on the second shadow map and the plurality of photographed images.

17. A non-transitory computer-readable storage medium configured to store a computer program that enables a computer to execute a processing method,
wherein the processing method includes the steps of:
acquiring a plurality of photographed images of an object, the images being photographed by sequentially irradiating light onto the object from a plurality of different light source positions;
generating a first shadow map by determining a shadow area in the plurality of photographed images;
generating a second shadow map based on the first shadow map; and
obtaining normal information of the object calculated based on the second shadow map and the plurality of photographed images.

* * * * *